United States Patent
Haserodt et al.

(10) Patent No.: US 12,071,248 B2
(45) Date of Patent: Aug. 27, 2024

(54) ACTIVELY DRIED EQUIPMENT UNIT WITH A MOVABLE MECHANICAL ELEMENT IN AN AIRCRAFT

(71) Applicant: Airbus Operations GmbH, Hamburg (DE)

(72) Inventors: Jan Haserodt, Hamburg (DE); Christoph Winkelmann, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 106 days.

(21) Appl. No.: 17/861,448

(22) Filed: Jul. 11, 2022

(65) Prior Publication Data
US 2023/0009445 A1  Jan. 12, 2023

(30) Foreign Application Priority Data

Jul. 12, 2021 (EP) .................................... 21185123

(51) Int. Cl.
*B64D 13/08* (2006.01)
*B64D 13/06* (2006.01)

(52) U.S. Cl.
CPC ...... *B64D 13/08* (2013.01); *B64D 2013/0662* (2013.01)

(58) Field of Classification Search
CPC ................ B64D 13/08; B64D 2013/0662; B64D 33/00; F03D 11/02; B64C 13/28
See application file for complete search history.

(56) References Cited

U.S. PATENT DOCUMENTS

| | | | | |
|---|---|---|---|---|
| 3,448,038 A | * | 6/1969 | Pall | ........................ C10G 33/06 261/96 |
| 5,873,256 A | * | 2/1999 | Denniston | .......... B60H 1/00414 62/271 |
| 6,447,573 B1 | | 9/2002 | Rake | |
| 2003/0075043 A1 | | 4/2003 | Rake | |
| 2013/0129512 A1 | * | 5/2013 | Kleber | .................... F03D 15/00 416/170 R |
| 2020/0378329 A1 | | 12/2020 | Muto et al. | |

FOREIGN PATENT DOCUMENTS

KR  2007 0030321 A  3/2007

OTHER PUBLICATIONS

European Search Report for Application No. 21185123 dated Dec. 16, 2021.
European Office Action for Application No. 21185123 dated Mar. 5, 2024.

* cited by examiner

*Primary Examiner* — Richard Green
*Assistant Examiner* — Steven J Shur
(74) *Attorney, Agent, or Firm* — KDW Firm PLLC

(57) ABSTRACT

An equipment unit for installation in an aircraft includes an enclosure, in which at least one movable mechanical element is arranged, a supply duct, and a non-return valve, wherein the enclosure includes an inflow port and an outflow port, wherein the supply duct is connected to the inflow port, wherein the non-return valve is connected to the outflow port, wherein the supply duct is connectable to a source of heated air providable in the respective aircraft, and wherein the enclosure is designed that air supplied through the supply duct enters the enclosure through the inflow port, picks up moisture from inside the enclosure and exits through the outflow port.

10 Claims, 1 Drawing Sheet

ACTIVELY DRIED EQUIPMENT UNIT WITH A MOVABLE MECHANICAL ELEMENT IN AN AIRCRAFT

CROSS-REFERENCE TO RELATED APPLICATION

This application claims priority to EP Patent Application No. 21185123.3 filed Jul. 12, 2021, the entire disclosure of which is incorporated by reference herein.

TECHNICAL FIELD

The disclosure herein relates to an equipment unit for installation in an aircraft, an aircraft, and the use of a source of heated air.

BACKGROUND

Mechanical aircraft equipment is usually either designed fully vented or sealed against the environment where temperature, moisture and pressure variations occur during operation. For a fully vented design water ingress into the equipment is possible, e.g. via humidity entrained in the air. Water collections are prevented by drainage bores and air exchange. A sealed unit is designed to protect against ingress of humidity, water, sand, and dust, etc. The equipment typically is lubricated by oil or grease and the performance characteristics also depend on the temperature of the lubricant.

For both design concepts, i.e. fully vented or sealed, it is often still challenging to provide a design sufficiently robust against water ingress over the whole aircraft life. For fully vented units drain channels could be blocked and prevent moisture from exiting the unit, for sealed designs the sealing function could deteriorate over time.

SUMMARY

It is an object of the disclosure herein to provide an improved design concept for equipment units having a movable mechanical element in an aircraft, where water accumulation can reliably be prevented.

This object is met by an equipment unit for installation in an aircraft. Advantageous embodiments and further improvements are disclosed in the following description.

An equipment unit for installation in an aircraft comprises an enclosure, in which at least one movable mechanical element is arranged, a supply duct, and a non-return valve, wherein the enclosure comprises an inflow port and an outflow port, wherein the supply duct is connected to the inflow port, wherein the non-return valve is connected to the outflow port, wherein the supply duct is connectable to a source of heated air providable in the respective aircraft, and wherein the enclosure is designed that air supplied through the supply duct enters the enclosure through the inflow port, picks up moisture from inside the enclosure and exits through the outflow port.

The equipment unit is a piece of equipment, which is to be integrated into an aircraft. It comprises at least one movable mechanical element, which usually requires a certain type of lubrication. As stated in the background of the disclosure herein, sealed and unsealed variants are known, wherein both are prone to water accumulation. It is a gist of the disclosure herein to design the equipment unit in such a way, that water ingress is tolerable, as the inflow port and the outflow port allow to lead air at an elevated temperature through the respective enclosure.

For example, the air may be provided by a bleed air port from an engine of the aircraft, by an air-conditioning pack or by a tank inerting system. Air at an elevated temperature enters the enclosure via the inflow port. The air flows into the enclosure and exemplarily sweeps over the at least one mechanical component. Moisture that is present in the enclosure will be entrained into this air flow and exits the outflow port. Hence, moisture is removed and water ingress can be tolerated through such a drying function.

For providing this function, only little modifications are required for a common equipment unit. For example, the inflow port and the outflow port are to be provided, as well as the air supply duct. A source of heated air is already present in the aircraft and merely needs to be connected to the air supply duct. It is to be pointed out that the air supply duct does not require a large cross-sectional surface, as only a rather small airflow is required for drying the enclosure. Thus, the diameter of the supply duct may be in the range of e.g. 1 to 3 cm or less. On the other hand, seals of the enclosure may be less sophisticated, due to the continuous drying function.

In an advantageous embodiment, the at least one movable mechanical element protrudes through an opening in a wall of the enclosure. For example, the at least one movable mechanical element may include a shaft that rotates inside the enclosure and protrudes through the respective wall to transfer the rotation to another mechanical element outside the enclosure. Hence, if a movable mechanical element protrudes through the respective wall, the opening must be provided. Depending on the design philosophy or the type of mechanical element a gap between an opening contour and the movable mechanical element must be sealed or may be left as it is. Water ingress through the gap may be compensated by the concept of drying with heated air.

In an advantageous embodiment, the opening comprises a sealing device for sealing the at least one movable mechanical element against the respective wall. The sealing device is to be adapted to the desired motion of the movable mechanical element. For example, the mechanical element may provide an axial, linear motion, such that the sealing device is required to provide the sealing function even if the movable element slides along the sealing device. In an analogy, this applies to a rotating motion.

In another embodiment the opening is unsealed and a part of air that enters the enclosure through the inflow port exits through a gap between the at least one movable mechanical element and the opening. By not providing a sealing device in this region air may simply exit through the opening and water or dirt accumulation in this region may be prevented.

In a preferred embodiment a lubricant is provided in the enclosure to be blown over by the air from entering the enclosure. Water accumulation in the lubricant may be prevented. At the same time, the lubricant is continuously heated, depending on the temperature of the heated air. In doing so, the lubricant may comprise an elevated, controlled temperature. This leads to more predictable lubrication characteristics.

According to an advantageous embodiment, the inflow port and the outflow port are arranged on opposite walls of the enclosure. The air thus flows from one side of the enclosure to an opposite side, thus completely sweeping over the interior space of the enclosure. It may be advantageous to adapt the angles of the inflow port and the outflow port in such a way that flow directions are not parallel to each other, which may lead to a certain swirl inside the enclosure.

The disclosure herein also relates to an aircraft, comprising at least one source of heated air, and at least one equipment unit according to the above, wherein the at least one source of heated air is connected to the supply duct of the at least one equipment unit. The aircraft may be a commercial aircraft having a pressurized cabin. The equipment unit may exemplarily be arranged in a non-pressurized part of the aircraft.

In an advantageous embodiment, the at least one source of heated air is chosen from a group of sources of heated air, the group comprising a bleed air port of an engine, an air conditioning pack, and a tank inerting system. The bleed air port may be arranged in at least one compressor stage of a turbojet engine. Advantageously, bleed air delivered to the enclosure may be taken from a lower bleed air port, where the compression is only moderate and the temperature relatively low, compared to further higher compressor stages. Air from the tank inerting system may be an inflow or outflow air and may be oxygen depleted.

In a still further advantageous embodiment, the at least one source of heated air is adapted to supply air with a controlled temperature in a range of 5° C. to 40° C.

The disclosure herein further relates to the use of a source of heated air provided in an aircraft for drying an enclosure of an equipment unit in the aircraft comprising at least one movable mechanical element.

BRIEF DESCRIPTION OF THE DRAWINGS

Other characteristics, advantages and potential applications of the disclosure herein result from the following description of the example embodiments illustrated in the figures. In this respect, all described and/or graphically illustrated characteristics also form the object of the disclosure herein individually and in arbitrary combination regardless of their composition in the individual claims or their references to other claims. Furthermore, identical, or similar objects are identified by the same reference symbols in the figures.

DETAILED DESCRIPTION

Figure 1:
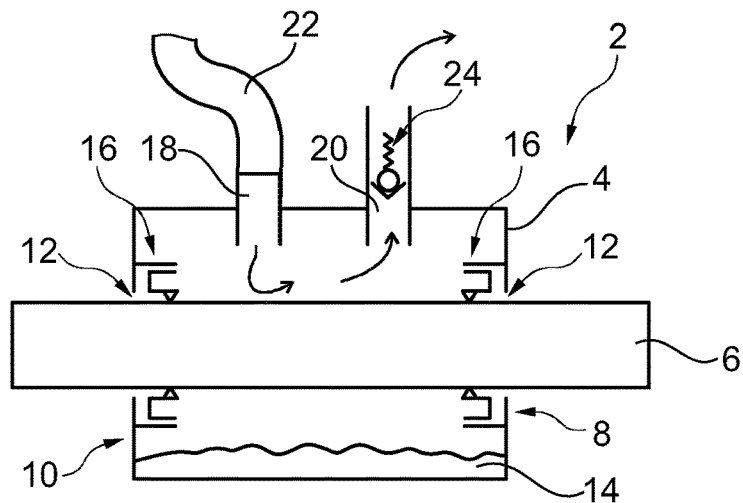
FIG. 1 shows a first example embodiment of an equipment unit for installation in an aircraft.

FIG. 1 shows an equipment unit 2 for installation in an aircraft. The equipment unit 2 comprises an enclosure 4, in which movable mechanical element 6 is provided. In this example, the movable element 6 may be a shaft, a rod, or an axle. It is intended to conduct a motion relative to the enclosure 4. It protrudes through two opposite walls 8 and 10 through an opening 12 in each case. Inside the enclosure 4, a liquid or pasty lubricant 14 is provided to lubricate a mechanism not shown in detail herein. In the example embodiment shown in FIG. 1, both openings 12 comprise a sealing device 16, which is adapted to seal the movable element 6 relative to the respective opening 12. For example, the sealing devices 16 include a rotary shaft seal.

The enclosure 4 furthermore comprises an inflow port 18 and an outflow port 20. The inflow port 18 is connected to a supply duct 22 for providing heated air from a source of heated air. Heated air enters the enclosure 4 through the inflow port 18 and flows out through the outflow port 20. At the outflow port 20, a non-return valve 24 is provided. It opens in an outflow direction and prevents ingress of water and dirt from outside the outflow port 20. It will only open in case of a sufficient overpressure inside the enclosure 4. By continuously providing heated air through the inflow port 18, moisture inside the enclosure 4 is removed. Furthermore, the lubricant 14 will be slightly heated through the heated air, such that it comprises a desired and predictable lubrication behavior.

Figure 2:
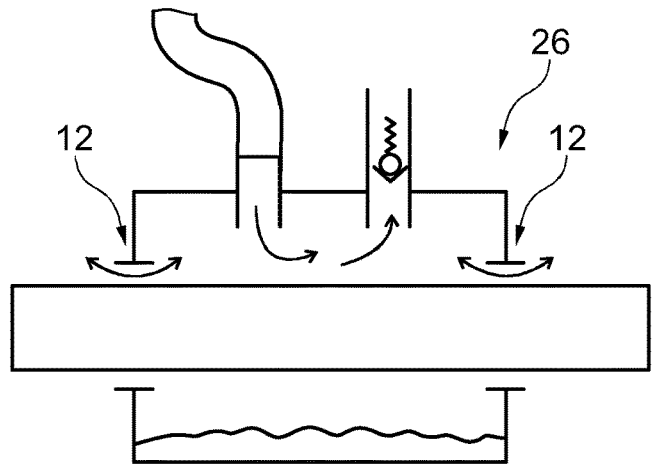
FIG. 2 shows a second example embodiment of an equipment unit for installation in an aircraft.

In FIG. 2, another example embodiment in form of an equipment unit 26 is shown. Here, substantially the same elements are provided. However, the openings 12 remain unsealed. Here, a part of air flowing into the enclosure 4 through the inflow port 18 exits through the openings 12.

Figure 3:
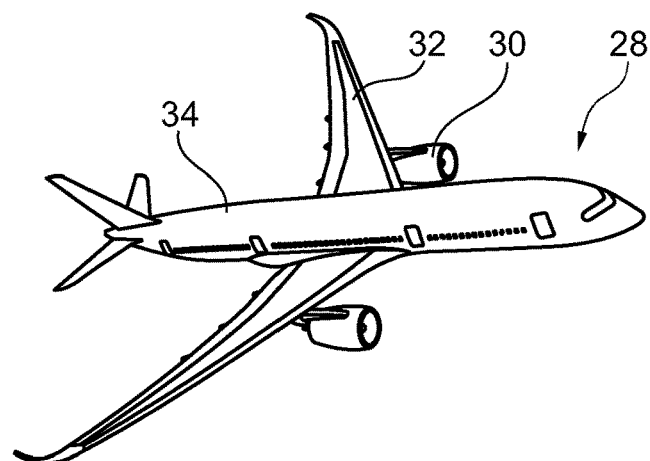
FIG. 3 shows an aircraft.

FIG. 3 shows an aircraft 28 having engines 30, a wing 32, and a fuselage 34. The equipment unit 2 or 26 may be arranged inside the aircraft 28, for example in the wing 32. Also, the equipment unit 2 or 26 may be arranged outside a pressurized part of the fuselage 34. For example, it may belong to a high lift system installed in the wing 32. Air to be delivered to the inflow port 18 may be taken from a bleed air port of the engines 30 and can be provided through the supply duct, which may advantageously be a flexible hose-like duct.

In addition, it should be pointed out that "comprising" does not exclude other elements or steps, and "a" or "an" does not exclude a plural number. Furthermore, it should be pointed out that characteristics or steps which have been described with reference to one of the above example embodiments may also be used in combination with other characteristics or steps of other example embodiments described above. Reference characters in the claims are not to be interpreted as limitations.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 equipment unit
4 enclosure
6 movable mechanical element
8 wall
10 wall
12 opening
14 lubricant
16 sealing device
18 inflow port
20 outflow port
22 supply duct
24 non-return valve
26 equipment unit
28 aircraft
30 engine
32 wing
34 fuselage

The invention claimed is:

1. An equipment unit for installation in an aircraft, comprising:
   an enclosure, in which at least one movable mechanical element is disposed, the enclosure comprising an inflow port and an outflow port;
   a supply duct connected to the inflow port;
   a non-return valve connected to the outflow port;
   the supply duct being connectable to a source of heated air providable in the aircraft; and
   the enclosure configured so air supplied continuously through the supply duct can enter the enclosure through the inflow port, pick up moisture from inside the enclosure, and exit through the outflow port once an overpressure sufficient to operate the non-return valve is produced.

2. The equipment unit according to claim 1, wherein the at least one movable mechanical element protrudes through an opening in a wall of the enclosure.

3. The equipment unit according to claim 2, wherein the opening comprises a sealing device for sealing the at least one movable mechanical element against the respective wall.

4. The equipment unit according to claim 2, wherein the opening is unsealed and a part of air that enters the enclosure through inflow port exits through a gap between the at least one movable mechanical element and the opening.

5. The equipment unit according to claim 1, wherein a lubricant is in the enclosure to be blown over by the air from entering the enclosure.

6. The equipment unit according to claim 1, wherein the inflow port and the outflow port are arranged on opposite walls of the enclosure.

7. An aircraft comprising:
   at least one source of heated air; and
   at least one equipment unit according to claim 1;
   wherein the at least one source of heated air is connected to the supply duct of the at least one equipment unit.

8. The aircraft according to claim 7, wherein the at least one source of heated air is selected from the group of sources of heated air consisting of:
   a bleed air port of an engine;
   an air conditioning pack; and
   a tank inerting system.

9. The aircraft according to claim 7, wherein the at least one source of heated air is configured to supply air with a controlled temperature in a range of 5° C. to 40° C.

10. A method for drying an enclosure of an equipment unit in an aircraft comprising at least one movable mechanical element, the method comprising:
   continuously flowing heated air from a source provided in the aircraft to an inflow port of the enclosure;
   removing moisture from inside the enclosure with the heated air; and
   once an overpressure sufficient to operate a non-return valve is produced, flowing the heated air through an outflow port of the enclosure.

* * * * *